United States Patent
Kannapiran et al.

(10) Patent No.: US 12,450,774 B2
(45) Date of Patent: Oct. 21, 2025

(54) VISUAL ODOMETRY FOR OPERATING A MOVABLE DEVICE

(71) Applicant: Ford Global Technologies, LLC, Dearborn, MI (US)

(72) Inventors: Shenbagaraj Kannapiran, Tempe, AZ (US); Nalin Bendapudi, Ann Arbor, MI (US); Devarth Parikh, Ann Arbor, MI (US); Ankit Girish Vora, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 18/324,398

(22) Filed: May 26, 2023

(65) Prior Publication Data

US 2024/0394915 A1    Nov. 28, 2024

(51) Int. Cl.
G06T 7/73      (2017.01)
G05D 1/00      (2006.01)
G06T 7/174     (2017.01)

(52) U.S. Cl.
CPC ............ *G06T 7/74* (2017.01); *G05D 1/0251* (2013.01); *G06T 7/174* (2017.01); *G06T 2207/20084* (2013.01); *G06T 2207/30244* (2013.01)

(58) Field of Classification Search
CPC . G06T 7/74; G06T 7/164; G06T 2207/20084; G06T 2207/30244; G06T 7/593; G05D 1/0251
See application file for complete search history.

(56) References Cited

U.S. PATENT DOCUMENTS 9,329,598 B2    5/2016  Pack et al.
10,096,129 B2  10/2018  Narang et al.
(Continued)

FOREIGN PATENT DOCUMENTS

| CN | 108682027 A | 10/2018 |
| CN | 110375732 A | 10/2019 |
| CN | 112649016 A | 4/2021 |

OTHER PUBLICATIONS

Zhao, Wanqing et al. "Learning Deep Network for Detecting 3D Object Keypoints and 6D Poses." 2020 IEEE/CVF Conference on Computer Vision and Pattern Recognition (CVPR). IEEE, 2020. 14122-14130. Web. (Year: 2020).*

(Continued)

*Primary Examiner* — John R Wallace
(74) *Attorney, Agent, or Firm* — Frank A. Mackenzie; Brooks Kushman P.C.

(57) ABSTRACT

A computer that includes a processor and a memory, the memory including instructions executable by the processor to select first side stereo images of first and second pairs of stereo images acquired at first and second time steps, respectively, and mask first and second first side stereo images, determine point features in masked first and second first side stereo images and determine line features in masked first and second first side stereo images. Matching point features in the masked first and second first side stereo images can be determined using a first attention/graph neural network (attn/GNN) based on keypoints determined based on the line features. Matching line features in the masked first and second first side stereo images can be determined using a second attn/GNN based on keypoints determined based on the line features. Three-dimensional (3D) locations in a scene can be determined by determining stereo disparity based on the matched point features included in the first first side stereo image and point features determined in a first (Continued)

second side stereo image of first and second stereo pairs of images and a 3D stereo camera pose can be determined by determining a perspective-n-point and line algorithm on the 3D locations.

20 Claims, 11 Drawing Sheets

(56) References Cited

U.S. PATENT DOCUMENTS

| | | | |
|---|---|---|---|
| 11,270,148 | B2 | 3/2022 | Li et al. |
| 2017/0359561 | A1* | 12/2017 | Vallespi-Gonzalez ...................... H04N 13/239 |
| 2023/0316571 | A1* | 10/2023 | Kadambi .................. G06T 7/80 382/188 |

OTHER PUBLICATIONS

Zhang et al., "DynPL-SVO: A New Method Using Point and Line Features for Stereo Visual Odometry in Dynamic Scenes", arXiv:2205.08207v2 [cs. CV] Sep. 29, 2022. (Year: 2022).*

Sarlin, Paul-Edouard et al. "SuperGlue: Learning Feature Matching With Graph Neural Networks." 2020 IEEE/CVF Conference on Computer Vision and Pattern Recognition (CVPR). IEEE, 2020. 4937-4946. Web. (Year: 2020).*

Agostinho, Sérgio, João Gomes, and Alessio Del Bue. "CvxPnPL: A Unified Convex Solution to the Absolute Pose Estimation Problem from Point and Line Correspondences." Journal of mathematical imaging and vision 65.3 (2023): 492-512. Web. (Year: 2023).*

Agostinho et al., CvxPnPL: A Unified Convex Solution to the Absolute Pose Estimation Problem from Point and Line Correspondences, arXiv:1907.10545v2 [cs.CV] Aug. 9, 2019.

Bay et al., "SURF: Speeded Up Robust Features", https://link.springer.com/chapter/10.1007/11744023_32.

DeTone et al., "SuperPoint: Self-Supervised Interest Point Detection and Description", This CVPR workshop paper is the Open Access version, provided by the Computer Vision Foundation. It is identical to the version available on IEEE Xplore.

Dosovitskiy et al., "CARLA: An Open Urban Driving Simulator", arXiv:1711.03938v1 [cs.LG] Nov. 10, 2017.

Lowe, "Distinctive Image Features from Scale-Invariant Keypoints", Accepted for publication in the International Journal of Computer Vision, 2004.

Luo et al., "Accurate Line Reconstruction for Point and Line-Based Stereo Visual Odometry", Received Dec. 4, 2019, accepted Dec. 16, 2019, date of publication Dec. 19, 2019, date of current version Dec. 31, 2019. Digital Object Identifier 10.1109/ACCESS.2019.2960805.

Pautrat et al., "SOLD2: Self-supervised Occlusion-aware Line Description and Detection", This CVPR 2021 paper is the Open Access version, provided by the Computer Vision Foundation. It is identical to the accepted version; the final published version of the proceedings is available on IEEE Xplore.

Rublee et al., "ORB: an efficient alternative to SIFT or SURF", https://ieeexplore.ieee.org/document/6126544.

Sarlin et al., "SuperGlue: Learning Feature Matching with Graph Neural Networks", This CVPR 2020 paper is the Open Access version, provided by the Computer Vision Foundation. It is identical to the accepted version; the final published version of the proceedings is available on IEEE Xplore.

Yi et al., "LIFT: Learned Invariant Feature Transform", https://www.researchgate.net/publication/308277668, conference Paper •Oct. 2016 DOI: 10.1007/978-3-319-46466-4_28.

Zhang et al., "DynPL-SVO: A New Method Using Point and Line Features for Stereo Visual Odometry in Dynamic Scenes", arXiv:2205.08207v2 [cs.CV] Sep. 29, 2022.

* cited by examiner

VISUAL ODOMETRY FOR OPERATING A MOVABLE DEVICE

BACKGROUND

Computers can operate systems and/or devices including vehicles, robots, drones, and/or object tracking systems. Data including images can be acquired by sensors and processed using a computer to determine a location of a system with respect to objects in an environment around the system. The computer can use the location data to determine trajectories for moving a system in the environment. The computer can then determine control data to transmit to system components to control system components to move the system according to the determined trajectories.

DETAILED DESCRIPTION

Figure 1:
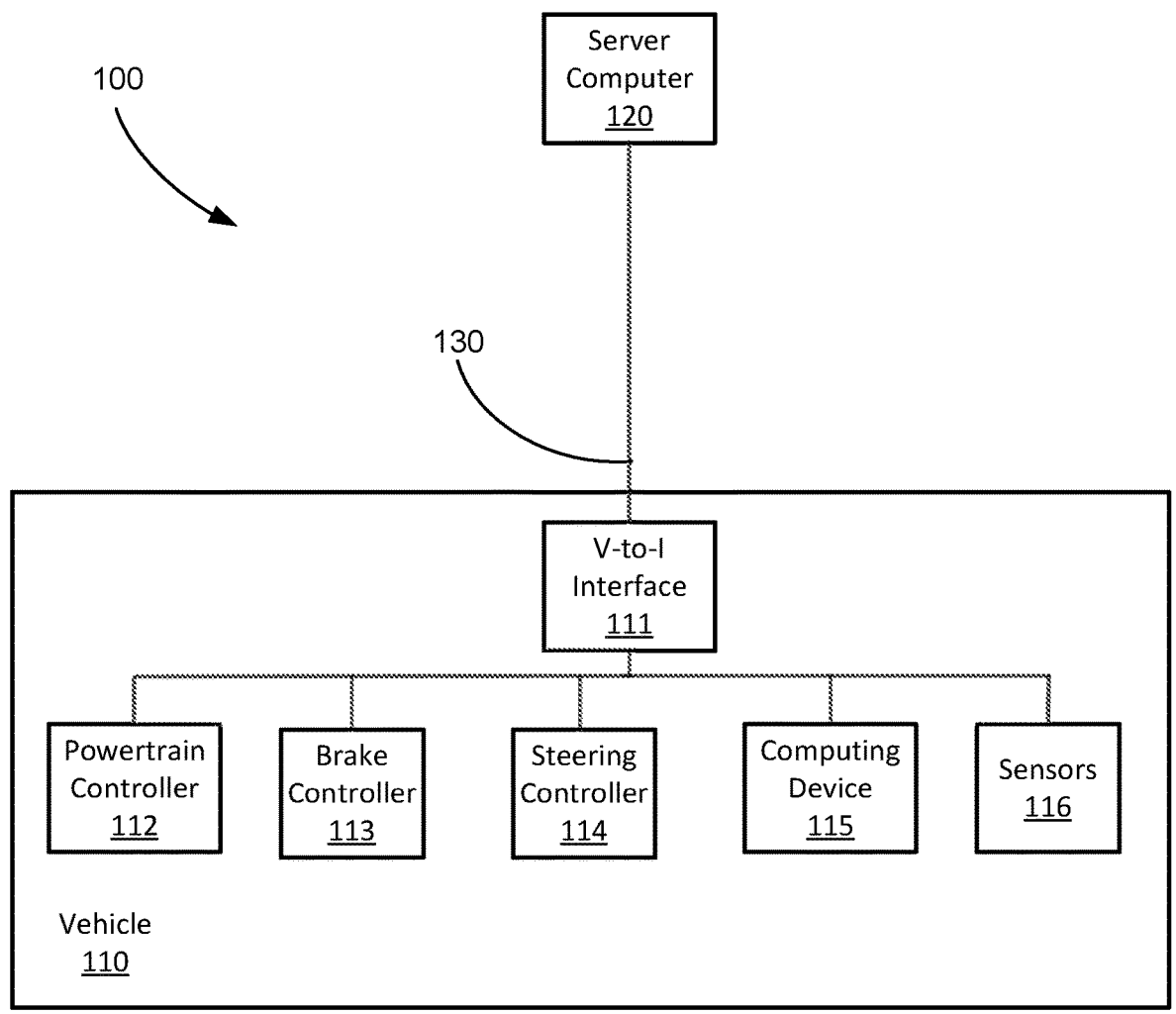
FIG. 1 is a block diagram of an example vehicle system.

Systems including vehicles, robots, drones, etc., can be operated by acquiring sensor data regarding an environment around the system and processing the sensor data to determine a path upon which to operate the system or portions of the system. The sensor data can be processed to determine a location in real world coordinates of the system in an environment. The determined location can then be used to operate the system. For example, a mobile robot can determine its location in a warehouse or workplace. A vehicle can determine its location on a roadway. The determined location can be used by a mobile robot or vehicle to determine a path upon which to operate to move the mobile robot or vehicle from the determined location to a planned location.

Movable systems can rely on sensor data acquired by sensors included in the system to determine a location of the movable system and/or a movable element of the system (e.g., a vehicle, a robot arm, etc.) with respect to an environment. Some sensors, such as lidar or radar, return range or distance data directly. Other sensors, such as visible or infrared video sensors, can rely on one or more two-dimensional (2D) images to determine distances to locations in an environment. Stereo vision relies on two cameras arranged to view overlapping fields of view. The change in locations of the same points in the two images acquired from a pair of stereo, referred to as stereo disparity, can be used to determine the distance of the points to a point within the stereo cameras.

Stereo video odometry is a technique for determining the location of a vehicle with respect to an environment using stereo camera data. Stereo video odometry matches feature points in a pair of stereo images acquired by stereo video cameras and determines stereo disparity based on matched feature points. Feature points are pixel locations in an image determined by local configurations of pixel intensities such as edges and corners. Stereo disparity is the difference in pixel locations of two feature points corresponding to the same location in a scene included in the two stereo images. Stereo disparity can be combined with intrinsic camera data including image scaling and focal distance to determine a distance between the stereo camera and locations in the scene.

The ability of a stereo video odometry technique to determine distance to locations in a scene depends upon the ability of the system to accurately and repeatably determine feature points corresponding to the same locations in both stereo images. Accurate and repeatable determination of feature points means determining the same feature points at the same locations upon repeated trials. Low contrast and low light conditions such as inclement weather and darkness can make accurate stereo video odometry difficult to achieve. Techniques for stereo video odometry described herein use line features in addition to point features to increase the ability of the system to determine accurate and repeatable feature points in low contrast and low light conditions.

A computing device in a system can use stereo video odometry to operate the system. Stereo video odometry can determine the location of a stereo camera with respect to a scene viewed by the stereo camera by determining distances to points in the scene. Distances to points in a scene can be combined with map data such as GOOGLER maps, global navigation satellite system (GNSS) data such as global positioning system (GPS) data, and/or inertial measurement unit (IMU) data to determine system location and orientation in real world coordinates. An IMU uses accelerometers to determine system location and orientation in real world coordinates. Real world coordinates can be defined in terms of global x, y, and z location coordinates with respect to latitude, longitude and altitude and roll, pitch, and yaw rotational coordinates with respect to the x, y, and z axes, respectively.

Map data and GPS data include locations in real world coordinates with resolutions measured in one or more meters. IMU data can include higher resolution location data but returns only relative measurements rather than real world coordinates. Operating a system can require location resolutions in the 10 centimeter (cm) range or less and rotational resolutions of one degree or less. Stereo video odometry can be combined with map data, GPS data, and IMU data to provide high resolution location and orientation data, defined as location resolutions in the sub-10 cm range and rotational resolutions of one degree or less.

High resolution location and orientation defined herein as high resolution pose data can be used by a computing device in a system to operate a system such as a vehicle, robot arm, etc. A technique for operating a system includes determining a path polynomial upon which a system can travel from a current location to a planned location. A path polynomial can be a polynomial function determined to maintain lower and upper limits on lateral and longitudinal accelerations as a system travels on the path polynomial. A computing device in a system can control system actuators to cause the system to travel along the path polynomial. In examples where the system is a vehicle, a computing device can control vehicle propulsion, steering, and brakes to cause the vehicle to travel along the path polynomial.

A method is disclosed herein, including selecting first side first and second stereo images of first and second pairs of stereo images acquired at first and second time steps, respectively and masking first and second first side stereo images. Point features can be determined in masked first and second first side stereo images and line features can be determined in masked first and second first side stereo images. Matching point features can be determined in the masked first and second first side stereo images using a first attention/graph neural network (attn/GNN) based on keypoints determined based on the line features. Matching line features can be determined in the masked first and second first side stereo images using a second attn/GNN based on keypoints determined based on the line features. Three-dimensional (3D) locations can be determined in a scene by determining stereo disparity based on the matched point features included in the first first side stereo image and point features determined in a first second side stereo image of first and second pairs of stereo images. A 3D stereo camera pose can be determined by determining a perspective-n-points-and-line algorithm on the 3D locations.

The first and second first side stereo images can be masked by determining first and second segmented images for the first and second first side stereo images by an image segmentor and masking the first and second first side stereo images based on the first and second segmented images, respectively. Masking the first and second first side stereo images can remove dynamic objects and sky. The point features can be determined in the masked first and second first side stereo images by self-supervised machine learning using the first attn/GNN followed by a differentiable optimal transport processor. The line features can be determined in the masked first and second first side stereo images by self-supervised machine learning using the second attn/GNN followed by a differentiable optimal transport processor. The point features can be determined based on a Superpoint algorithm. The line features can be determined based on a SOLD2 algorithm. The keypoints can be determined by sampling the line features determined in the masked first and second first side stereo images. Point features can be determined in the first second side stereo image of first and second pairs of stereo images based on correlating pixel neighborhoods surrounding point features in the first left stereo image. Stereo disparity can be determined by determining a distance between point features in the first second side stereo image and the masked first first side stereo image and based on one or more of a baseline between stereo cameras, a focal distance, and a pixel scale. The 3D stereo camera pose can be determined with one or more of global navigation satellite system (GNSS) data, or inertial measurement unit (IMU) to determine a 3D vehicle pose based on an extended Kalman filter. A path polynomial can be determined based on the 3D vehicle pose, and operate a vehicle based on the path polynomial. Superpoint can be a neural network-based feature point detector. SOLD2 can be an occlusion aware line feature detection and description algorithm.

Further disclosed is a computer readable medium, storing program instructions for executing some or all of the above method steps. Further disclosed is a computer programmed for executing some or all of the above method steps, including a computer apparatus, programmed to select first side first and second stereo images of first and second pairs of stereo images acquired at first and second time steps, respectively and mask first and second first side stereo images. Point features can be determined in masked first and second first side stereo images and line features can be determined in masked first and second first side stereo images. Matching point features can be determined in the masked first and second first side stereo images using a first attention/graph neural network (attn/GNN) based on keypoints determined based on the line features. Matching line features can be determined in the masked first and second first side stereo images using a second attn/GNN based on keypoints determined based on the line features. Three-dimensional (3D) locations can be determined in a scene by determining stereo disparity based on the matched point features included in the first first side stereo image and point features determined in a first second side stereo image of first and second pairs of stereo images. A 3D stereo camera pose can be determined by determining a perspective-n-points-and-line algorithm on the 3D locations.

Instructions can include further instructions to mask the first and second first side stereo images by determining first and second segmented images for the first and second first side stereo images by an image segmentor and masking the first and second first side stereo images based on the first and second segmented images, respectively. Masking the first and second first side stereo images can remove dynamic objects and sky. The point features can be determined in the masked first and second first side stereo images by self-supervised machine learning using the first attn/GNN followed by a differentiable optimal transport processor. The line features can be determined in the masked first and second first side stereo images by self-supervised machine learning using the second attn/GNN followed by a differentiable optimal transport processor. The point features can be determined based on a Superpoint algorithm. The line features can be determined based on a SOLD2 algorithm. The keypoints can be determined by sampling the line features determined in the masked first and second first side stereo images. Point features can be determined in the first second side stereo image of first and second pairs of stereo images based on correlating pixel neighborhoods surrounding point features in the first left stereo image. Stereo disparity can be determined by determining a distance between point features in the first second side stereo image and the masked first first side stereo image and based on one or more of a baseline between stereo cameras, a focal distance, and a pixel scale. the 3D stereo camera pose can be determined with one or more of global navigation satellite system (GNSS) data, or inertial measurement unit (IMU) to determine a 3D vehicle pose based on an extended Kalman filter. A path polynomial can be determined based on the 3D vehicle pose, and operate a vehicle based on the path polynomial. Superpoint can be a neural network-based feature point detector. SOLD2 can be an occlusion aware line feature detection and description algorithm.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate the vehicle 110 based on data received from the sensors 116 and/or data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2X interface 111 and computing device 115, and therefore these features will not be described further to reduce redundancy. A server computer 120 can be used to develop and train software that can be transmitted to a computing device 115 in a vehicle 110.

Figure 2:
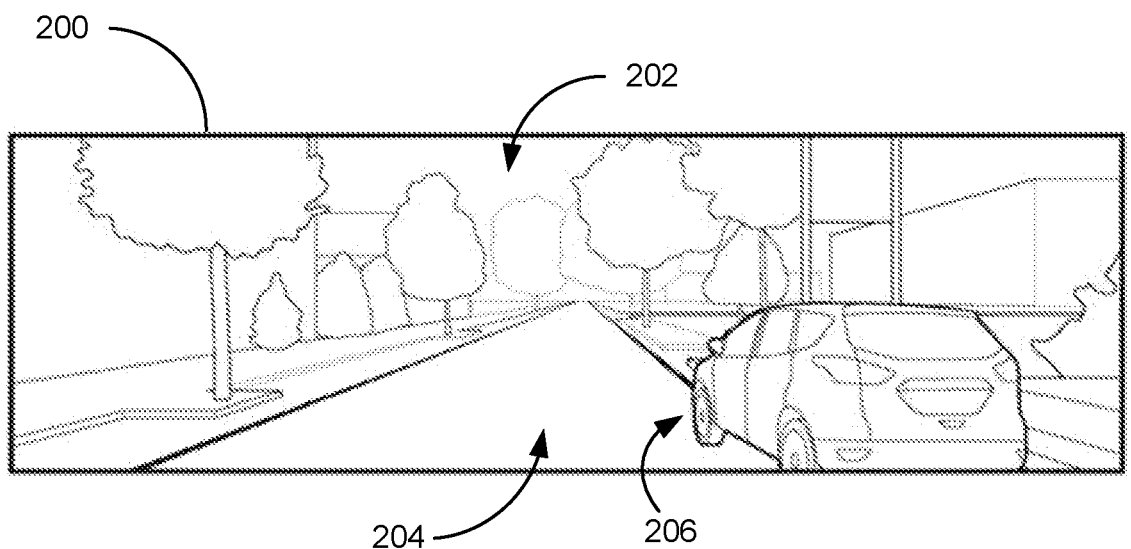
FIG. 2 is a diagram of example images of a scene.

FIG. 2 is a diagram of an image 200 of scene 202. Image 200 includes roadway 204 with a vehicle 206 traveling on roadway 204. Image 200 can be acquired by a video camera included in a pair of stereo cameras included in a vehicle 110, for example. A computing device 115 included in vehicle 110 can input image 200 a one of a pair of stereo images to a stereo video odometry system included in the computing device 115 to determine a high resolution pose for vehicle 110 with respect to a scene 202. The high resolution pose can be used by computing device 115 to determine a path polynomial to operate vehicle 110 through scene 202.

Figure 3:
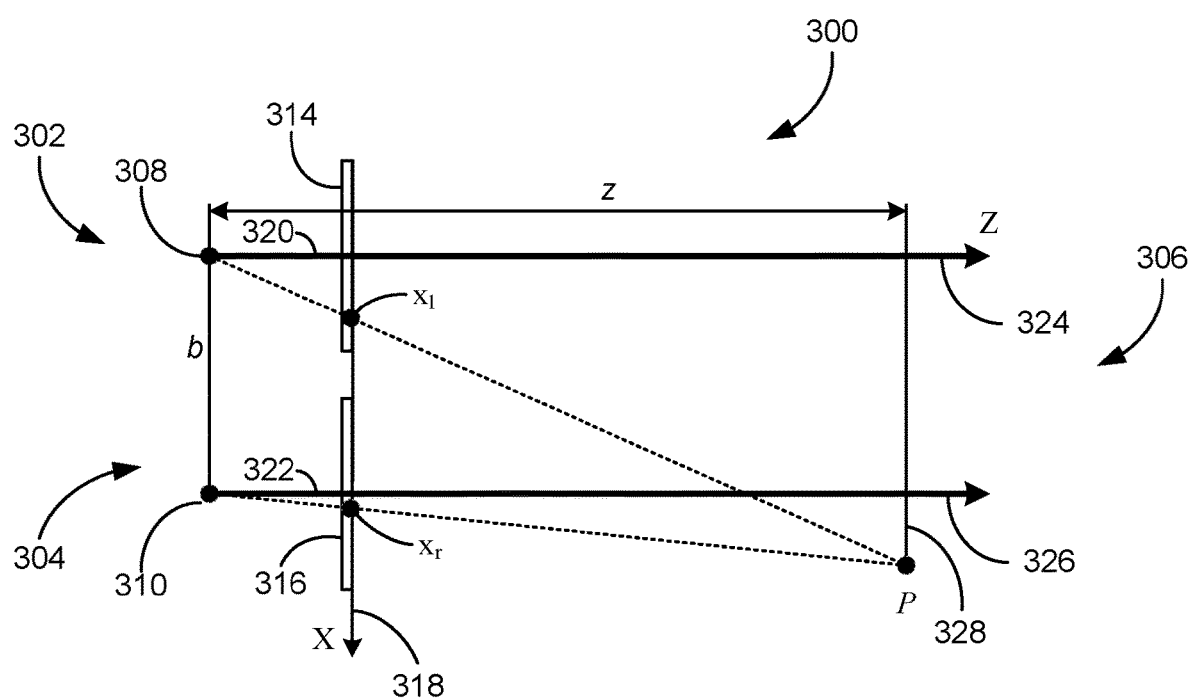
FIG. 3 is a diagram of an example stereo camera.

FIG. 3 is a schematic diagram of a stereo camera 300. Stereo camera 300 includes a left camera 302 and a right camera 304, both configured to view a scene 306. Left camera 302 and right camera 304 each include an optical center 308, 310, respectively. Left camera 302 and right camera 304 can be configured to view the scene 306 along parallel optical axes 324, 326, respectively. The optical axes 324, 326 and the sensor plane 318 can be configured to be perpendicular, forming the Z and X axes. The Y axis is in the direction perpendicular to the page. The sensor plane 318 includes the left image sensor 314 and right image sensor 316 included in left camera 302 and right camera 304, respectively. The optical centers 308, 310 are separated by a baseline distance b. Left sensor 314 and right sensor 316 are located in the sensor plane 318 at focal distances f 320, 322 from optical centers 308, 310, respectively.

Stereo camera 300 can be used to determine a depth z from the plane defined by the optical centers 308, 310 of left and right cameras 302, 304, respectively to a point P in scene 306. Point P is a distance $x_p$ 328 from right optical axis 326. Assuming a pinhole optical model for left and right stereo cameras 302, 304, images of the point P is projected onto left sensor 314 and right sensor 316 at points $x_l$ and $x_r$, respectively. Values $x_l$ and $x_r$ indicate distances from right and left optical axes 324, 326. The value $(x_l - x_r) = d$ is referred to as stereo disparity d. The stereo disparity d can be converted from pixel distance to real world distance by multiplying times a scale factor s. The depth z can be determined from the stereo disparity d, the focal distance f, pixel scale s and baseline b by the equation:

$$z = \frac{f * b}{s * d} \quad (1)$$

In this example, the stereo pairs of images are displaced from each other only in the x-direction along the X axis, meaning that stereo disparity d is determined only along the X axis.

Figure 4:
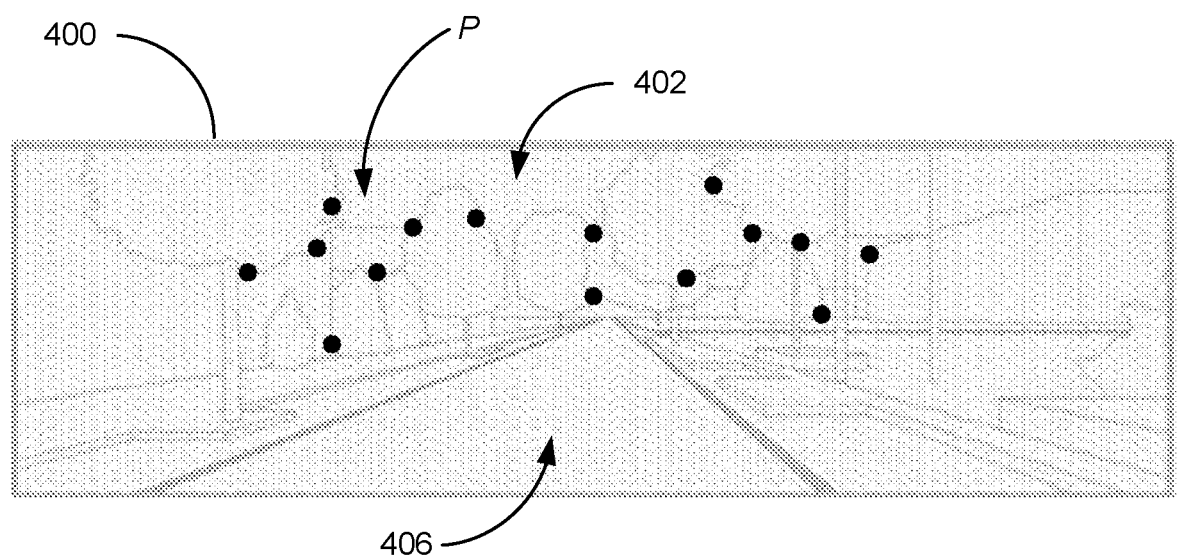
FIG. 4 is a diagram of an example scene including feature points.

FIG. 4 is a diagram of an image 400 of a scene 402. Image 400 can be one of a pair of stereo images acquired by a stereo camera 300. Image 400 can be used as one of a pair of stereo images to determine depth z for points P (dots) in scene 402 as described above in relation to FIG. 3. Image 400 as illustrated was acquired in foggy conditions 406, causing low contrast conditions in image 400. Low contrast conditions present challenges for stereo vision odometry because point feature detectors rely on local image contrast to generate feature points P. Stereo video odometry technique described herein use a neural network-based feature point P detector to obtain feature points P reliably and repeatedly in low contrast and low light images 400.

The neural network-based feature point P detector is a Superpoint algorithm. Superpoint is a neural network-based feature point P detector described in DeTone, D., Malisiewicz, T. and Rabinovich, A., "Superpoint: Self-supervised interest point detection and description," Proceedings of the IEEE conference on computer vision and pattern recognition workshops, 2018. Superpoint uses a convolutional neural network to encoder to generate interest points from an input image and two separate decoder heads to process the interest points to generate interest points and descriptors for the interest points. Despite Superpoint's enhanced performance in generating feature points P, low contrast and low light conditions can cause Superpoint to perform unreliably. To remedy this situation, stereo video techniques discussed herein detects line features in addition to feature points P.

Figure 5:
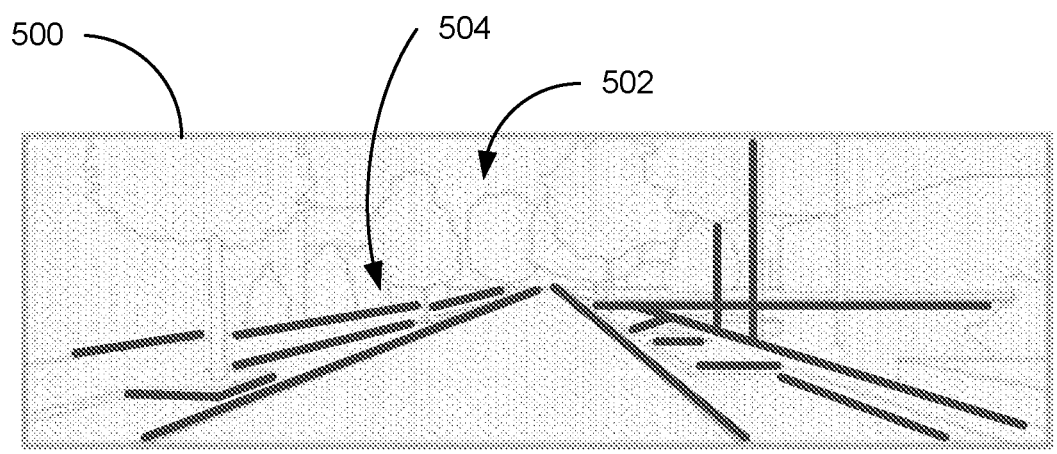
FIG. 5 is a diagram of an example scene including feature lines.

FIG. 5 is a diagram of an image 500 of a scene 502. Image 500 can be one of a pair of stereo images acquired by a stereo camera 300. Image 500 includes low contrast due to foggy conditions, similar to image 400. Image 500 can be acquired at the same time as image 400, above or at a different time as image 400. In this example the time step between acquiring image 400 and image 500 can be small, so that despite motion of the stereo camera 300 used to acquire image 400 and 500, the scenes 402 and 502 included in images 400 and 500, respectively will not change appreciably. Image 500 can be used to augment the feature points P determined in image 400 by determining line features 504.

Line features 504 can be determined in a low contrast or low light image using the SOLD2 algorithm. SOLD2 is an occlusion aware line feature detection and description algorithm. Stereo video odometry techniques as described herein use only the line detection portion of SOLD2 and ignore the line matching portion of the algorithm. SOLD2 is configured to perform well on low contrast and low light conditions by training the algorithm on synthetic data generated to simulate low contrast and low light conditions, SOLD2 is described in Pautrat, R., Lin, J. T., Larsson, V., Oswald, M. R. and Pollefeys, M., "SOLD2: Self supervised occlusion-aware line description and detection," Proceedings of the IEEE/CVF Conference on Computer Vision and Pattern Recognition, 2021.

Figure 6:
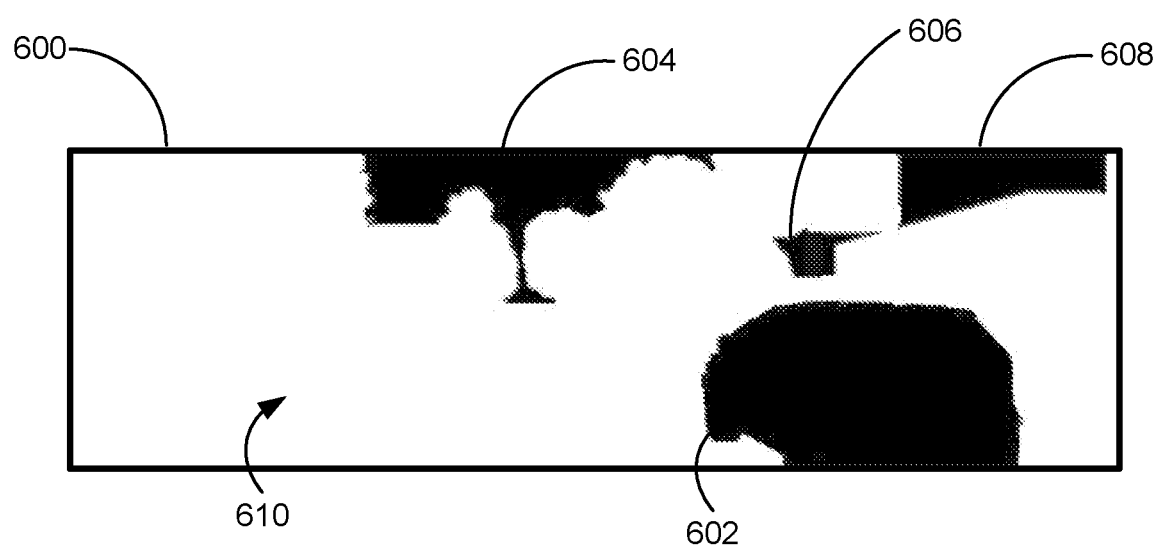
FIG. 6 is a diagram of an example segmented image of a scene.

FIG. 6 is a diagram of a segmented image 600 based on image 200 of scene 202. Segmented image 600 is generated by receiving an input image 200 at an image segmentor. An image segmentor is a software program that can execute on computing device 115, for example. Segmented image 600 can be determined by receiving an input image 200 at an image segmentor that groups pixels into contiguous regions according to edges and pixel values. For example, segmentor can determine edges using an edge detection routine such as a Canny edge detector. The average color value and variance of pixels withing regions of pixels bounded by edges can be determined. Adjacent regions having average values within a user selected variance can be merged to determine a segmented image 600 by determining image segments which group regions of contiguous pixels by color similarity.

An example of image processing software that performs image segmentation is the IntelligentScissorsMB routine in the OpenCV image processing library, located at OpenCV.org as of the filing date of this application. IntelligentScissorsMB uses a watershed algorithm (a known technique for image segmentation) to group pixels by color within edges located using a Canny edge detector. In some examples images can be segmented using a trained neural network to generate a segmented image 600 in a similar fashion to the OpenCV image processing library. Based on the color, size, shape, and location, segmentor can identify individual segments or regions within a segmented image as a particular type of object. For example, an image segmentor can identify regions as either a dynamic object 602, sky 604, 606, 608 or background 610 regions, where dynamic object 602 is a vehicle, for example. Segmented image 600 can be used as a mask to guide stereo video odometry processing as described in relation to FIG. 7, below. By masking off dynamic objects 602 and sky 604, 606, 608 processing based on segmented image 600 can permit a stereo video odometry system to generate more reliable and repeatable point features P.

Figure 7:
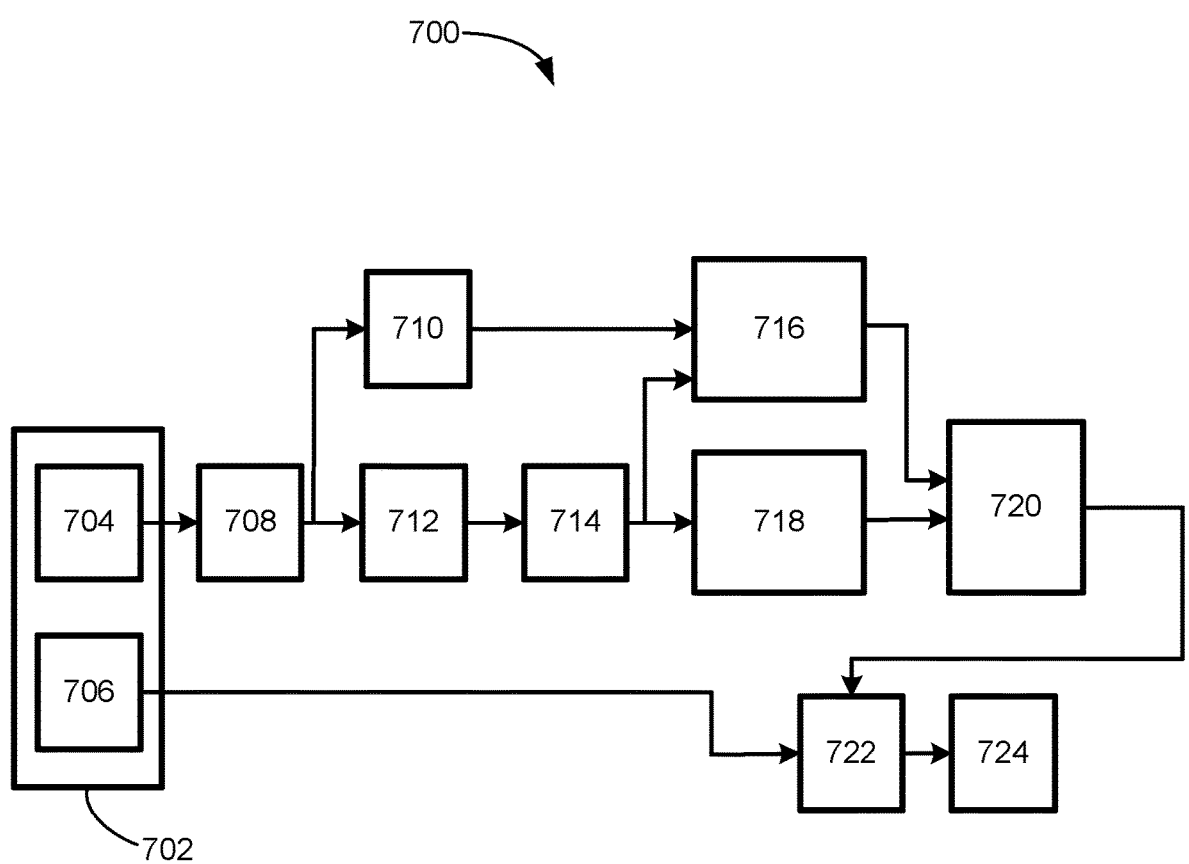
FIG. 7 is a diagram of an example stereo video odometry system.

FIG. 7 is a block diagram of a stereo video odometry system 700. The stereo video odometry system 700 receives as input left stereo image 704 and right stereo image 706 from a stereo camera 702 and outputs a 3D camera pose estimate. Stereo video odometry system 700 operates by selecting a time-adjacent pair of either right stereo images or left stereo images. For ease of explication herein, a time-adjacent pair of left stereo is described as selected. That is, left images are what can be referred to as "first side" images. For generality, one could refer to first side and second side images, where a first side is one of right or left, and a second side is the other of right or left. For convenience in explanation, left images are first side images, and right images are second side images, and the examples herein. A time-adjacent pair of right stereo images could also be used, i.e., right images could be first side images, and left images could be second side images, without loss of generality. The stereo video odometry system 700 inputs two left stereo images 704 acquired at different times separated by a small time step. The time step can be a single frame time, e.g., 16.7 milliseconds for 60 frame-per-second video. Stereo video odometry system 700 will process the two left stereo images 704 to determine feature points P that occur in both left stereo images 704 to increase the reliability and repeatability of the detected feature points P.

A segmentor 708 can receive the two left stereo images 704 to segment the two sequential left stereo images 704 to remove dynamic objects such as vehicles and sky as described above in relation to FIG. 6. The two sequential left stereo images 704 are then received at both a point feature processor 710 and a line feature processor 712. As described above in relation to FIG. 4, point feature processor 710 uses a Superpoint algorithm to detect feature points P in two sequential frames of left stereo image 704. In parallel with the point feature processor 710, a line feature processor 712 detects line features 504 in the sequential left stereo images 704. Detected line features 504 are sampled and processed with the Superpoint algorithm on the sampled points to obtain keypoint features. Following line feature processor 712, keypoint detector 714 detects keypoints which are point features that occur on line features 504.

Following point feature P detection and line/point feature detection, the point features P and keypoint features are received by self-supervised machine learning based on attention/graph neural networks (attn/GNN) 716, 718, respectively. The attn/GNNs 716, 718 are based on Superglue, a point matching graph neural network described in Sarlin, P. E., DeTone, D., Malisiewicz, T. and Rabinovich, A., 2020, "Superglue: Learning feature matching with graph neural networks," Proceedings of the IEEE/CVF conference on computer vision and pattern recognition, 2020. Processing the point features P and keypoint features with attn/GNNs 716, 718 includes processing the output with a differentiable optimal transport processor 720.

Attn/GNNs 716, 718 and differentiable optimal transport processor 720 combine to match two sets of point features P and keypoint features by jointly finding correspondences and rejecting non-matchable points by solving a differentiable optimal transport problem, whose computational costs are predicted by a Attn/GNNs 716, 718. In this context, match means that a first feature point in a first image, determined by a pattern in the pixel values of surrounding pixels, can be moved to the location of a second feature point, determined by the same pattern of surrounding pixel values in a second image by a single transformation that moves similar matching feature points in the first and second images. An attn/GNN 716, 718 processor can determine patterns of feature points in first and second images and determine transformations that move the patterns of feature points in the first image to overlay the patterns of feature points in the second image. In examples where more than one transformation exists to move the patterns of feature points, optimal transport processing can determine the minimal computational cost, e.g., most efficient, transformation that moves the feature points from a first image to the feature points from a second image. The pairs of feature points that are moved by the transform to overlay are referred to as matching feature points.

Optimal transport processing includes algorithms for minimizing the computational cost of transporting items where there are multiple sources of the items and multiple destinations. In this example, moving point features P and keypoint features between adjacent images is a transport problem. The combination of attn/GNNs 716, 718 and differentiable optimal transport processor 720 can perform robust line matches in texture poor image data such as low contrast or low light level images.

Figure 8:
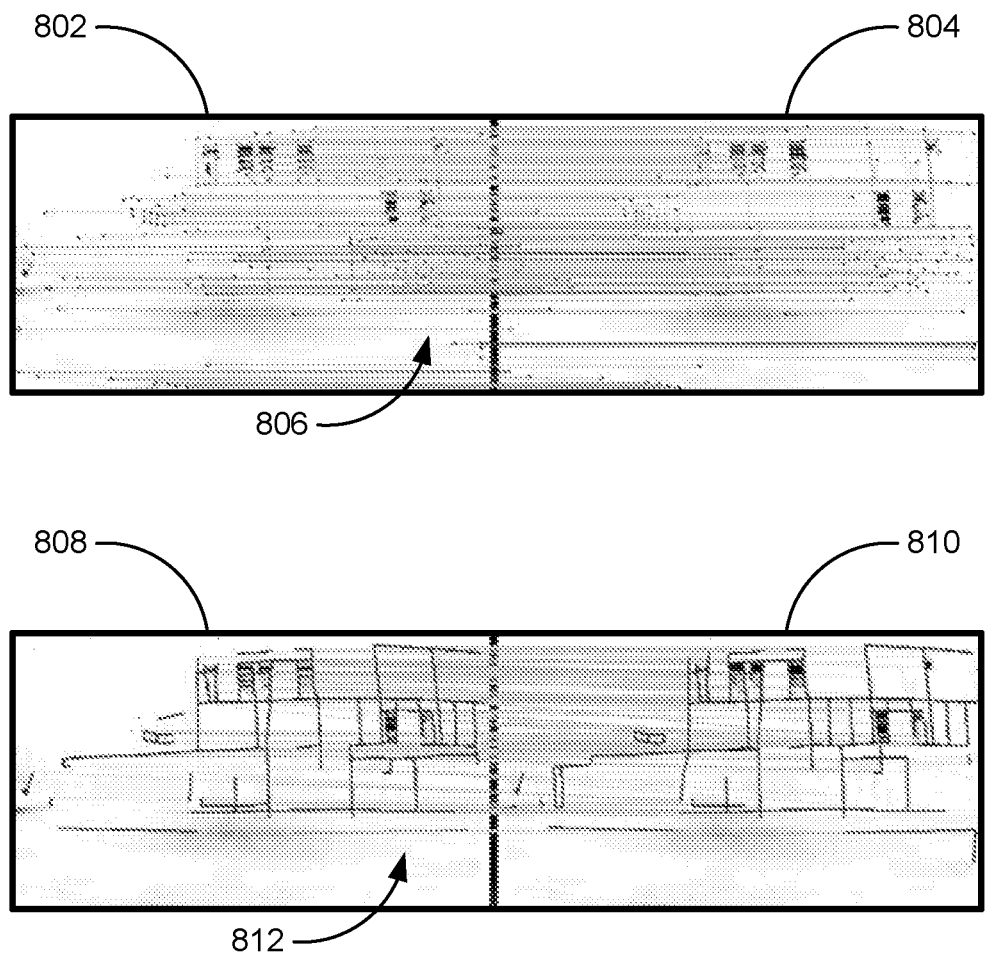
FIG. 8 is a diagram of example images of a scene including point matches and line matches.

Attn/GNNs 716, 718 generate visual appearance descriptors and considers the position of the keypoints with respect to other keypoints in the same image and adjacent image to perform robust feature matching. The keypoint features are used as anchor points which, when passed through the Attn/GNNs 716, 718, enable the lines to have position constraints. These constraints can achieve robust line matches in repetitive scenes containing little or no texture (such as repeating windows in buildings) which in existing solutions results in either no matches or wrong matches. The results of processing two adjacent frames of left stereo image 704 for both point features P and line features 504 are illustrated in FIG. 8.

Returning to FIG. 7, the point feature P matches and line features 504 matches for time-adjacent left stereo images 704 are received by 3D processing 722. The point features P and line feature 504 matches between time-adjacent left stereo images 704 are converted to 3D points by triangulation using stereo disparity d. Stereo disparity d can be obtained from right stereo image 706 received from stereo camera 702. The point features P and keypoint features received from differentiable optimal transport processor 720 can be used to determine locations of point features P included in right stereo image 706. Stereo disparity d can then be used to determine 3D locations of the point features P and line features 504 in the scene 202 using equation (1), above.

Point features P and line features 504 for adjacent frames of left stereo data 704 can be reduced to a set of point features P by selecting the point features P in one of the left stereo images that match point features P in the adjacent left stereo image. In this fashion, only point features P that occur in both adjacent left stereo images and are supported by keypoints derived from line features 504 are included in the output point features P. This provides reliable and repeatable point features P for determining 3D locations using stereo disparity d.

The point features P in the left stereo image can be used to determine matching point features P in the right stereo image by correlating pixel neighborhoods surrounding point features in the left stereo image. For each point feature P in the left stereo image, a small neighborhood of pixel values, for example 7×7 or 11×11 pixels, surrounding the point feature P can be used to form a correlation kernel. The correlation kernel can be used to determine the location in the right stereo image at which the for the correlation kernel has the highest correlation coefficient, e.g. where the neighborhood of pixels around the feature point P in the left stereo image have the same value and locations as the neighborhood of pixels around the right stereo image location. This location is the match for the left stereo point feature P and can be used to determine stereo disparity d as described above in relation to FIG. 3.

The 3D locations of the point features P and line features 504 can be received by pose solver 724, where a 3D pose of the stereo camera 702 is determined by a perspective-n-points-and-lines solver algorithm. The perspective-n-points-and-lines solver algorithm is described in Agostinho, S., Gomes, J. and Del Bue, A., "CvxPnPL: A unified convex solution to the absolute pose estimation problem from point and line correspondences," arXiv.com, arXiv: 1907.10545, 2019, as of the time of filing of this application. A perspective-n-points-and-lines solver algorithm iteratively determines a minimal error 3D pose for a camera based on the set of 3D points output by 3D processing 722.

FIG. 8 is a diagram of two time-adjacent left stereo images 802, 804 including matches, indicated by lines 806 between point features P and two time-adjacent left stereo images 808, 810 including matches, indicated by lines 812 between points determined based on line features 504. FIG. 8 illustrates output from differentiable optimal transport processor 720 that indicates matches received by 3D processing 722. Differentiable optimal transport processor 720 processes potential matches between point features P and points based on line features 504 to eliminate inconsistent matches. Consistent matches are matches that yield lines 806, 812 that are parallel and have a same length, within a user-determined tolerance, indicating that the same points in each of the pairs of images 802, 804 and 808, 810 have been selected as matching pairs.

Figure 9:
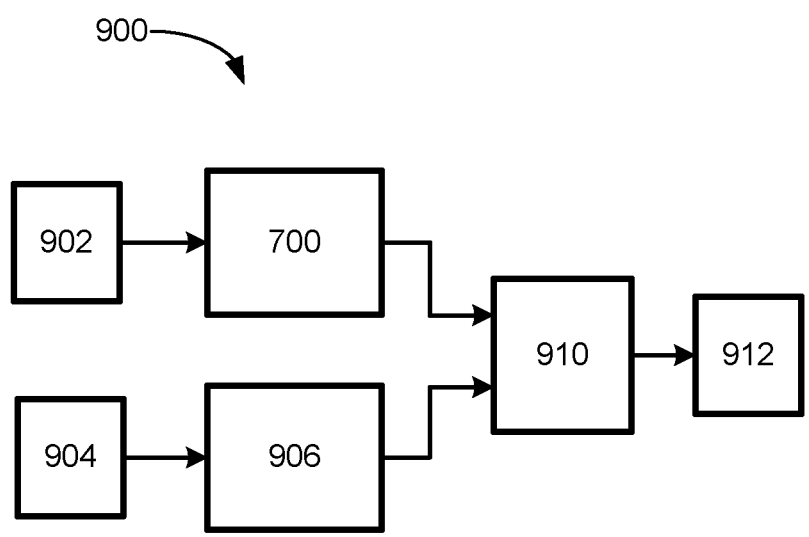
FIG. 9 is a diagram of an example localization system.

FIG. 9 is a diagram of a vehicle localization system 900 based on stereo video odometry. Vehicle localization system 900 determines a high resolution real world location 912 for a vehicle 110 based on receiving stereo image data from a stereo camera 902 and GNSS/IMU 904 data from sensors 116 included in vehicle 110. As defined above, a high resolution real world location has a resolution of about 10 cm. The stereo camera 902 data is processed as described above in relation to FIG. 7 by stereo video odometry system 700 to determine a 3D pose for the stereo camera 902. The GNSS/IMU 904 data is processed by odometry fusion processor 906 to produce a coarse location for the vehicle 110. As defined above, a coarse location has a resolution of greater than one meter. The 3D camera pose and the coarse location for the vehicle 110 is received by Extended Kalman Filter processor which produces a best fit between the 3D camera pose and the coarse vehicle location. Determining the best fit between the high resolution 3D camera pose and the coarse vehicle location generates a high resolution real world location 912 for the vehicle 110.

Figure 10:
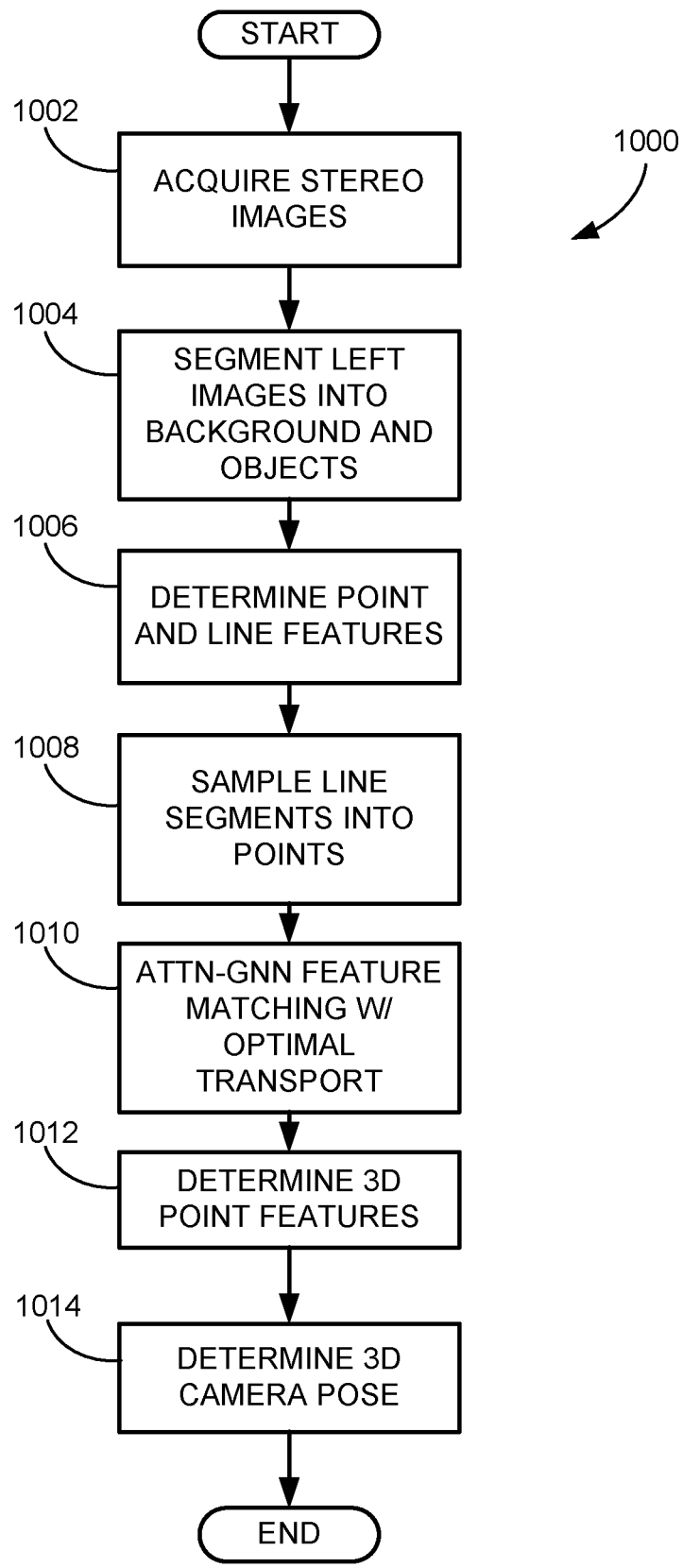
FIG. 10 is a flowchart diagram of an example stereo visual odometry system.

FIG. 10 is a flowchart of a process 1000 determining a 3D camera pose using a stereo video system 700. Process 1000 can be implemented in a computing device 115, for example. Process 1000 includes multiple blocks that can be executed in the illustrated order. Process 1000 could alternatively or additionally include fewer blocks or can include the blocks executed in different orders.

Process 1000 begins at block 1002 where a computing device 115 in a vehicle 110 acquires two time-adjacent pairs of left and right stereo images 704, 706 from a stereo sensor 116, which can be a video camera included in vehicle 110. The two time-adjacent pairs of left and right stereo images 704, 706 include data regarding an environment around the vehicle 110.

At block 1004 the two time-adjacent pairs of left and right stereo images 704, 706 are input to a stereo video odometry system 700 that segments time-adjacent left stereo images 704 to detect sky and dynamic objects with a segmentor 708. The segmented time-adjacent left stereo images 704 are segmented to eliminate dynamic objects 602 and sky 604, 606, 608, leaving only background 610 for further processing.

At block 1006 the segmented time-adjacent pairs of left stereo images 704 are received by point feature processor 710 and line feature processor 712 to determine point features P and line features 504 as described above in relation to FIG. 7.

At block 1008 line features 504 are received by keypoint detector 714 to determine keypoints indicated by line features 504 as described above in relation to FIG. 7.

At block 1010 the point features P and line features 504 are received by attn/GNNs 716, 718, respectively to determine point feature P and line feature 504 matches supported by keypoints received from keypoint detector 714. Output from attn/GNNs 716, 718 is received by optimal transport processor 720 which matches point features P and line features 504.

At block 1012 a pair of time-adjacent left stereo images 704 that includes matching point features P and a pair of time-adjacent left stereo images 704 that include line feature matches are input to 3D processor 722 to determine 3D locations in a scene 202 based on stereo disparity d determined by matching point features P from the left stereo image 704 with matching point features P determined in the right stereo image 706 as described above in relation to FIGS. 3 and 7.

At block 1014 3D locations are received by pose solver 724 which uses perspective-n-point and line algorithm to determine a 3D camera pose for the stereo camera 300 as described above in relation to FIG. 7. Following block 1014 process 1000 ends.

Figure 11:
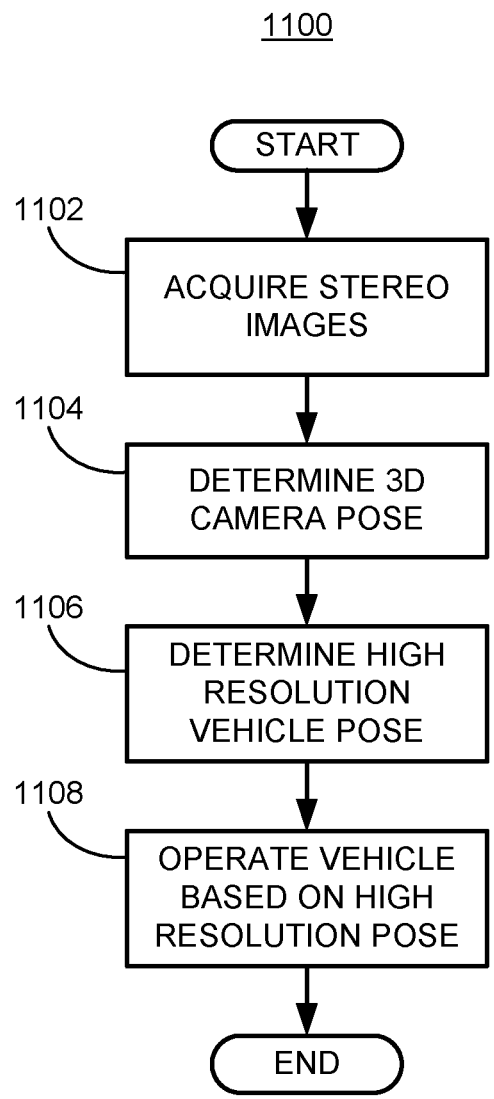
FIG. 11 is a flowchart diagram of an example process to operate a vehicle based on a localization system.

FIG. 11 is a flowchart of a process 1100 for operating a vehicle 110 based on a 3D camera pose determined by a stereo video system 700. Process 1100 is described in terms of operating a vehicle as a non-limiting example. Process 1100 can be applied more generally to moving systems. For example, process 1100 can provide high-resolution pose data to mobile systems such as mobile robots and drones. Process 1100 can also be applied to systems that include moving components, such as stationary robots, package sorting systems, and security systems. Process 1100 can be implemented by computing device 115 included in a vehicle 110. Process 1100 includes multiple blocks that can be executed in the illustrated order. Process 1100 could alternatively or additionally include fewer blocks or can include the blocks executed in different orders.

Process 1100 begins at block 1102, where a computing device 115 in a vehicle 110 acquires two pairs of time-adjacent left and right stereo images 704, 706 from a stereo camera 702.

At block 1104 the computing device 115 determines a 3D camera pose for the stereo camera 702 based on the two pairs of time-adjacent left and right stereo images 704, 702 as described above in relation to FIGS. 7 and 10.

At block 1106 computing device 115 determines a high resolution vehicle pose based on the 3D camera pose received from block 1104 and sensor data acquired from sensors 116 included in vehicle 110. Sensors can include GPS and IMU, for example.

At block 1108 computing device 115 operates a vehicle 110 based on the high resolution vehicle pose. For example, the computing device 115 can determine a path polynomial that directs vehicle motion from a current location based on the high resolution vehicle pose to a planned location. Vehicle 110 can be operated by determining a path polynomial function which maintains minimum and maximum limits on lateral and longitudinal accelerations. The vehicle 110 can be operated along a vehicle path by transmitting commands to controllers 112, 113, 114 to control vehicle propulsion, steering and brakes. Following block 1008 process 1100 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to:
  select first side first and second stereo images of first and second pairs of stereo images acquired at first and second time steps by a first side camera of a stereo camera, respectively;
  mask first and second first side stereo images;
  determine point features in the masked first and second first side stereo images;
  determine line features in the masked first and second first side stereo images;
  determine matching point features in the masked first and second first side stereo images using a first attention/graph neural network (attn/GNN) based on keypoints determined based on the line features;

determine matching line features in the masked first and second first side stereo images using a second attn/GNN based on keypoints determined based on the line features;

determine three-dimensional (3D) locations in a scene by determining stereo disparity based on the matched point features included in the first first side stereo image and point features determined in a first second side stereo image of first and second pairs of stereo images; and determine a 3D stereo camera pose by determining a perspective-n-points-and-line algorithm on the 3D locations.

2. The system of claim 1, the instructions including further instructions to mask the first and second first side stereo images by determining first and second segmented images for the first and second first side stereo images by an image segmentor and masking the first and second first side stereo images based on the first and second segmented images, respectively.

3. The system of claim 1, wherein masking the first and second first side stereo images removes dynamic objects and sky.

4. The system of claim 1, the instructions including further instructions to determine the point features in the masked first and second first side stereo images by self-supervised machine learning using the first attn/GNN followed by a differentiable optimal transport processor.

5. The system of claim 1, the instructions including further instructions to determine the line features in the masked first and second first side stereo images by self-supervised machine learning using the second attn/GNN followed by a differentiable optimal transport processor.

6. The system of claim 1, the instructions including further instructions to determine the point features based on a Superpoint algorithm.

7. The system of claim 1, the instructions including further instructions to determine the line features based on a SOLD2 algorithm.

8. The system of claim 1, the instructions including further instructions to determine the keypoints by sampling the line features determined in the masked first and second first side stereo images.

9. The system of claim 1, the instructions including further instructions to determine point features in the first second side stereo image of first and second pairs of stereo images based on correlating pixel neighborhoods surrounding point features in the first left stereo image.

10. The system of claim 1, the instructions including further instructions to determine stereo disparity by determining a distance between point features in the first second side stereo image and the masked first first side stereo image and based on one or more of a baseline between stereo cameras, a focal distance, and a pixel scale.

11. The system of claim 1, the instructions including further instructions to combine the 3D stereo camera pose with one or more of global navigation satellite system (GNSS) data, or inertial measurement unit (IMU) to determine a 3D vehicle pose based on an extended Kalman filter.

12. The system of claim 11, the instructions including further instructions to determine a path polynomial based on the 3D vehicle pose, and operate a vehicle based on the path polynomial.

13. A method, comprising:

selecting first side first and second stereo images of first and second pairs of stereo images acquired at first and second time steps, respectively;

masking first and second first side stereo images;

determining point features in masked first and second first side stereo images;

determining line features in masked first and second first side stereo images;

determining matching point features in the masked first and second first side stereo images using a first attention/graph neural network (attn/GNN) based on keypoints determined based on the line features;

determining matching line features in the masked first and second first side stereo images using a second attn/GNN based on keypoints determined based on the line features;

determining three-dimensional (3D) locations in a scene by determining stereo disparity based on the matched point features included in the first first side stereo image and point features determined in a first second side stereo image of first and second pairs of stereo images; and determining a 3D stereo camera pose by determining a perspective-n-points-and-line algorithm on the 3D locations.

14. The method of claim 13, further comprising masking the first and second first side stereo images by determining first and second segmented images for the first and second first side stereo images by an image segmentor and masking the first and second first side stereo images based on the first and second segmented images, respectively.

15. The method of claim 13, wherein masking the first and second first side stereo images removes dynamic objects and sky.

16. The method of claim 13, further comprising determining the point features in the masked first and second first side stereo images by self-supervised machine learning using the first attn/GNN followed by a differentiable optimal transport processor.

17. The method of claim 13, further comprising determining the line features in the masked first and second first side stereo images by self-supervised machine learning using the second attn/GNN followed by a differentiable optimal transport processor.

18. The method of claim 13, further comprising determining the point features based on a Superpoint algorithm.

19. The method of claim 13, further comprising determining the line features based on a SOLD2 algorithm.

20. The method of claim 13, further comprising determining the keypoints by sampling the line features determined in the masked first and second first side stereo images.

* * * * *